United States Patent [19]

Encaoua et al.

[11] Patent Number: 5,065,005
[45] Date of Patent: Nov. 12, 1991

[54] POLYCHROMATIC MUTUAL ALIGNMENT DEVICE FOR AN AIMING APPARATUS

[75] Inventors: Serge Encaoua, Clichy; Philippe Metivier, Poissy, both of France

[73] Assignee: Societe D'Applicitons Generales D'Electricite et de Mecanique (S.A.G.E.M.), France

[21] Appl. No.: 515,586

[22] Filed: Apr. 27, 1990

[30] Foreign Application Priority Data

May 3, 1989 [FR] France ................. 89 05887

[51] Int. Cl.$^5$ ............................................. H01J 40/14
[52] U.S. Cl. .................... 250/206.2; 356/152
[58] Field of Search .......................... 250/203.3, 206.2; 356/4.5, 141, 152

[56] References Cited

U.S. PATENT DOCUMENTS 4,811,061  3/1989  Sud et al. ............................ 356/152

Primary Examiner—David C. Nelms
Assistant Examiner—LaCharles P. Keesee
Attorney, Agent, or Firm—Larson and Taylor

[57] ABSTRACT

A polychromatic mutual alignment device is suitable for use in an aiming apparatus having a laser delivering a parallel light beam and a plurality of light receivers to be harmonized with the laser. The device comprises an optical mixer having at least two source-forming holes each receiving light delivered in a respective one of a plurality of spectral ranges for which alignment is to be achieved and a plate which is transparent in a wave length range and reflective in another wave range for combining the two light beams into a common mixer output beam; and a parabolic mirror having an axis and placed so as to receive the output beam at an angle with respect to said the axis, the mixer and the mirror being constructed so that all the source-forming holes are at the focal point of the mirror. The mixer further comprises a sensor responsive in the transmission range of the parallel light source and is so constructed that, when the light beam from the parallel light beam source is coaxial with the output beam, the sensor is at the focus of the mirror.

6 Claims, 1 Drawing Sheet

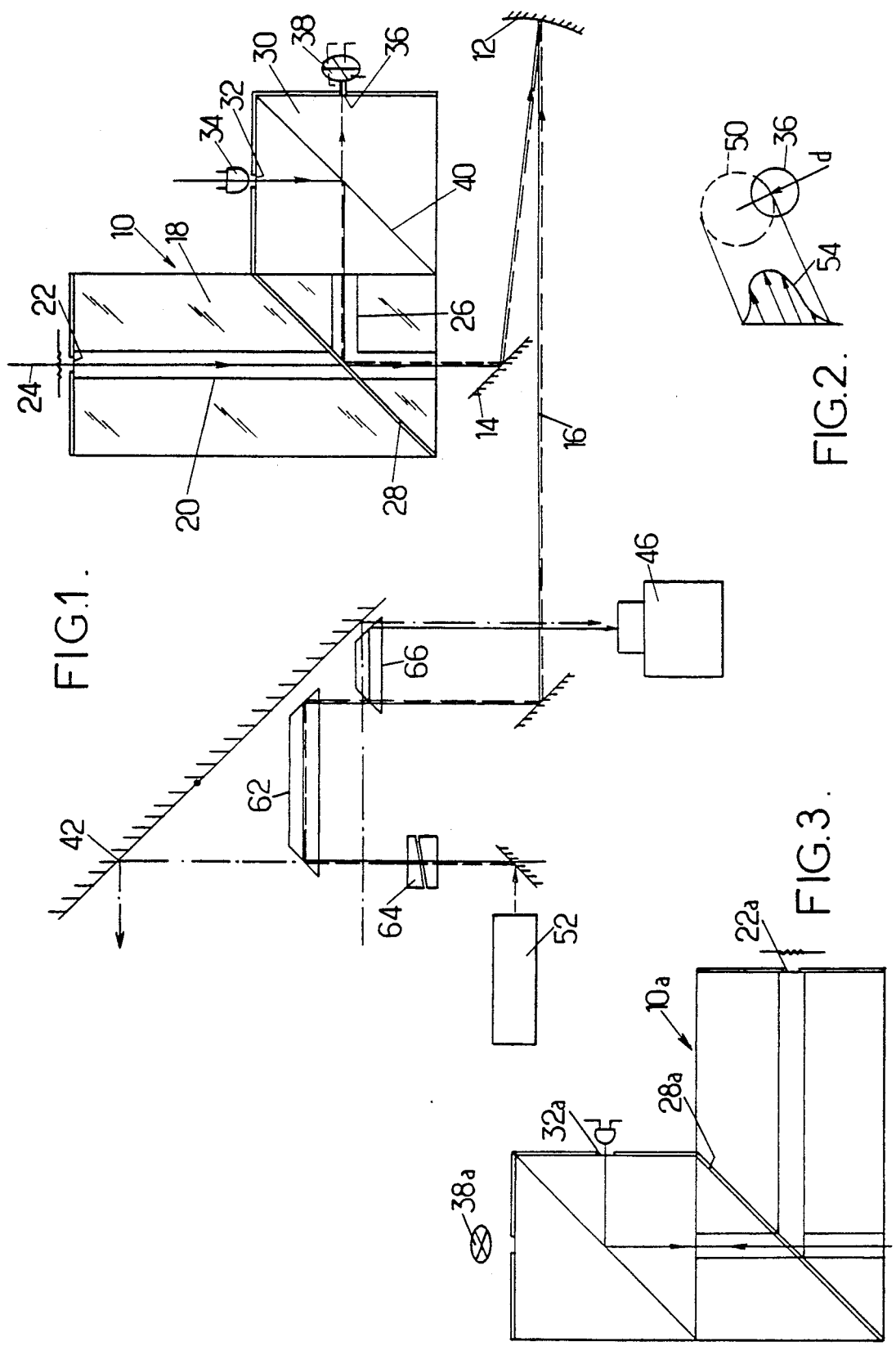

POLYCHROMATIC MUTUAL ALIGNMENT DEVICE FOR AN AIMING APPARATUS

BACKGROUND OF THE INVENTION

1. Technical Field

The invention relates to polychromatic mutual alignment devices according to U.S. Pat. No. 4,811,061 (Sud et al) and more particularly those intended for an aiming apparatus which comprises a source delivering a parallel light beam, to be harmonized with receivers and comprising:

an optical mixer having at least two holes each receiving light emitted in a respective one of spectral ranges for which alignment is to be achieved and a plate which is transparent in a wave length range and reflective in another wave range for combining the two light beams into a common block output beam;

and a parabolic mirror placed so as to receive the output beam at an angle with respect to its axis, the mixer and the mirror being formed so that all the source-forming holes are at the focal point of the mirror.

2. Prior Art

The alignment device described by way of example in U.S. Pat. No. 4,811,061 makes it possible to harmonize the aiming lines of a thermal camera, a CCD camera and a laser range-finder with an eye visual observation path of the apparatus, since it generates a common collimated optical reference in the visible, far infrared and near infrared ranges.

SUMMARY OF THE INVENTION

It is an object of the invention to provide a simplified device of the above-defined type by making it possible to dispense with a hole-source delivering light in the same spectral field as the source delivering a parallel light beam belonging to the aiming apparatus.

To this end, the invention provides a device of the above-defined type, wherein the mixer comprises a sensor responsive in the transmission range of the parallel light source and is such that, when the beam from the parallel light source is coaxial with said output beam, said sensor is also at the focal point of the mirror.

It can be seen that the device of the invention substitutes a reference channel at reception for one of the reference channels at transmission (for example in the visible range); if the aiming apparatus is of the type described by way of example in U.S. Pat. No. 4,811,061, the laser of the range finder forms the source delivering a parallel light beam.

The invention will be better understood from the following description of a particular embodiment given by way of non-limitative example.

BRIEF DESCRIPTION OF THE DRAWINGS

FIG. 1 is a schematic view of a polychromatic boresight device, in section through a plane passing through the axis of the different light beams, and of the components of an associated aiming apparatus required for describing the operation of the device;

FIG. 2 is a diagram showing a modified construction of the sensor carried by the device;

FIG. 3, similar to FIG. 1, shows a variant of the optical mixer.

DETAILED DESCRIPTION OF A PREFERRED EMBODIMENT

The mutual alignment device shown in FIG. 1 is intended to permit harmonization between three channels and, for this reason, to deliver a single collimated output beam having spectral components in two wavelength ranges, one from 8 to 12 $\mu$m (far infrared) and the other comprising visible light and near infrared;

to receive a monochromatic parallel or cylindrical collimated input beam, in the near infrared, and focussing this beam on a sensor.

For this, the device comprises an optical mixer 10 and a parabolic mirror 12 which receives the output beam from the mixer 10 (and the input beam); mirror 12 generates, from the divergent beam which it receives from the mixer, a parallel collimated output beam 16 and generates a convergent beam from the collimated parallel beam which it receives from the parallel light source. In the embodiment illustrated, a flat reflecting mirror 14 is interposed between mixer 10 and parabolic mirror 12.

Since the construction of the optical mixer 10 is described in detail in U.S. Pat. No. 4,811,061, to which reference may be made, only the indications necessary for understanding the present invention will be given here.

The optical mixer 10 comprises a first block 18 in which is formed a first passage 20 for light delivered by a source-forming hole 12, illuminated with light having considerable energy in the far infrared. Illumination may be provided by a filament 24 of noble metal, heated by passage of an electric current.

Block 18 is formed with a second passage 26, orthogonal to the first one, and through which the visible and near infrared light passes. Mixing the light fluxes is provided by a thin plate 28, transparent in the range from 8 to 12 $\mu$m and reflective in the near infrared and the visible ranges.

Mixer 10 comprises a second block 13 for:

sending into passage 26 a beam containing visible and near infrared light coming from a source 32, formed for example as a hole illuminated by a light emitting diode (LED) 34 emitting in the visible and near infrared.

receiving, through passage 26, a beam containing light from a parallel light source contained in the aiming apparatus and focusing it on a sensor 38 through a hole 36 forming a diaphragm.

The second block 30 may be solid, for there exist numerous optical materials having sufficient transparency in the visible and near infrared fields. Quartz may typically be used. The fluxes transmitted through the source-hole 32 and received by detector 38 are mixed by a dichroic plate 40, reflecting for the transmission from diode 34 and transparent for the light coming from the source of the aiming apparatus, or a semi-reflective plate.

Blocks 18 and 30 have dimensions such the optical paths from each of the holes to the parabolic mirror 16 are equal to the focal length of the mirror.

The aiming apparatus comprises an aiming and stabilization mirror 42, rotative about a shaft 44 and common to several optical channels working in different wavelength ranges. The device further comprises means for splitting the parallel beam 16, for mutual harmonization of the different channels, between a plurality of reception channels and one transmission channel. FIG. 1 shows a single reception channel, comprising a thermal camera 46, sensitive for example in the range from 8 to 12 μm and a transmission-reception channel formed by a laser range finder comprising a pulsed laser 52 and a receiver (not shown).

The thermal camera 46 is generally associated with electronics for determining the position of a spot formed from source 22 and overlaying, on the screen displaying the image formed by the camera, a reticle defining the thermal aiming line. An optical element must be provided for substituting the image of source 42 for that of the scene seen by the camera. In FIG. 1, the element is shown schematically as a retractable invariant reflector 66 (e.g. an optical corner prism) shown in the position in which it forms the image of source 22 on the camera.

Laser 52 forms a source delivering short pulses of monochromatic light (for example at 1.06 or 1.54 μm) repetitively in the form of a substantially parallel beam having, in a representative example, an amount of divergence not exceeding 0.4 mrad; it permits sensor 38 to be illuminated through an element for adjusting the position of the beam, shown in the form of a diasporameter 64 (i.e. a pair of independently rotatable prisms) and an invariant 66, when the latter is in the position shown in FIG. 1.

Sensor 38 is for indicating the direction of the angular difference between the beam of the laser entering the device and the reference or set axis defined by the center of the sensor. As illustrated in FIG. 1, sensor 38 is formed by a four quadrant cell. From the difference between the signals delivered by the pairs of mutually opposed quadrants, it is possible to determine the direction of the error and to correct it by means of the diasporameter 64.

In the modified embodiment shown in FIG. 2, the sensor is of a type capable simply of measuring the energy received through the hole 36. The sensor may in particular be a photodiode having sufficient size for collecting all the light energy passing through hole 36. Often, the optical system of the device is such that the spot 50 of the laser beam has a diameter of about 100 μm. The energy distribution in the beam generally has a rotational symmetry and is of the kind shown, in cross-section, by the curve 54 in FIG. 2. Provided that hole 36 has a diameter less than that of the spot, the light received by the detector will be a decreasing function of the error d. The beam of laser 52 entering device 10 is aligned with the reference axis when the power measured at the output of the sensor is maximum. Search for the maximum may be made either automatically, or by manual control of the diasporameter 64.

Use of the device is as in U.S. Pat. No. 4,811,061, except insofar as the laser range finder is concerned. Once the aiming line of the visual observation path has been aligned with the reference axis indicated by source 32, by means of the adjustment mirror 66, laser 52 may be harmonized by bringing the invariant or corner prism 62 into the position shown in FIG. 1 (invariant or corner prism 66 being retracted). Harmonization is provided by action on the diasporameter 64.

The modified embodiment shown in FIG. 3 differs from that of FIG. 1 in that plate 28 reflects the far infrared delivered by source 22a whereas it transmits the visible and near infrared (radiation transmitted by source 34a and radiation received by sensor 38a), whose positions may be inverted. This arrangement facilitates adjustment of the device, for the source-hole 22a may be adjusted in the visible without meeting problems associated with optical index changes depending on the wavelength or difficulties in finding materials transparent in the infrared only. Plate 28 may be made dichroic by the same deposition methods as in the case of FIG. 1, with different layer thicknesses.

We claim:

1. An aiming apparatus having:
   a laser delivering a parallel light beam in the near infrared range;
   a plurality of light receivers to be harmonized with said laser, each operating in a respective one of a plurality of wave length ranges other than near infrared;
   an aiming mirror arranged for simultaneously controlling light paths from said laser and to said light receiver toward and from an outside scene, respectively;
   a polychromatic mutual alignment device;
   optical switching means having one position wherein they direct said parallel light beam toward said aiming mirror and another position in which they direct said parallel light beam toward said mutual alignment device; and
   adjustment means located on the path of said parallel light beam between said laser and said optical switching means, for angularly altering the path of said parallel light beam;
   wherein said polychromatic mutual alignment device comprises:
   an optical mixer having at least two source-forming holes each receiving light delivered in a respective one of said plurality of wave length ranges for which mutual alignment is to be achieved; a plate which is transparent in one of said wave length ranges and reflective in another of said wavelength ranges for combining the two light beams into a common mixer output beam; and a sensor sensitive in the near infrared range;
   and a parabola mirror having an axis and placed so as to receive the output beam at an angle with respect to said axis, the mixer and the mirror being constructed so that all said source-forming holes are at the focus of the mirror; and wherein said mixer is so constructed that, when the near infrared light beam entering said mutual alignment device is coaxial with said output beam, said sensor is at a distance of the parabola mirror equal to the focal length of the latter and is centered with respect to the near infrared light beam.

2. Device according to claim 1, wherein said sensor is a four-quadrant detecting cell.

3. Device according to claim 1, wherein said sensor consists of light sensing means located behind a hole having a diameter smaller than a focal spot constituting an image of said source.

4. Device according to claim 1, wherein said laser belongs to a laser range finder.

5. Device according to claim 1, wherein said plate is located on the paths of far infrared light, said near infrared light and visible light from respective ones of said source-forming holes and is constructed to reflect said far infrared and to transmit near infrared light and visible light.

6. In an aiming apparatus having a laser range finder comprising a laser constituting a source delivering a parallel light beam and having a receiver and a camera operating in wavelength ranges which are mutually different and are different from that of said laser, a polychromatic mutual alignment device comprising:
- an optical mixer having at least two source-forming holes each receiving light delivered in a respective one of a plurality of wavelength ranges for which alignment is to be achieved and a plate which is transparent in a wavelength range and reflective in another wavelength range for combining the two light beams into a common mixer output beam;
- a parabolic mirror having an axis and placed so as to receive the output beam at an angle with respect to said axis, the mixer and the mirror being constructed so that all said source-forming holes are at the focus of the mirror; and
- an invariant optical component having one position where it directs light from said laser along a path comprising said parabolic mirror toward said mixer and it directs light from said two source-forming holes to said camera and receiver and another position in which it is out of light paths from said laser and to said camera and receiver,
- wherein said mixer further comprises a sensor responsive in the transmission range of the laser and is so constructed that, when the light beam from the laser is coaxial with said output beam, said sensor is at the focus of the mirror and wherein adjustment means are provided for adjusting the parallel light beam from said laser entering said device for coincidence with a reference axis in the device, passing through said sensor.

* * * * *